United States Patent
Kern et al.

(10) Patent No.: US 11,398,778 B2
(45) Date of Patent: Jul. 26, 2022

(54) CHARGE PUMP STRUCTURE WITH REGULATED OUTPUT VOLTAGE

(71) Applicant: Sciosense B.V., AE Eindhoven (NL)

(72) Inventors: Stefan Kern, Waghaeusel (DE); Torben Weng, Karlsruhe (DE)

(73) Assignee: SCIOSENSE B.V., AE Eindhoven (NL)

( * ) Notice: Subject to any disclaimer, the term of this patent is extended or adjusted under 35 U.S.C. 154(b) by 0 days.

(21) Appl. No.: 16/754,406

(22) PCT Filed: Oct. 17, 2018

(86) PCT No.: PCT/EP2018/078413
§ 371 (c)(1),
(2) Date: Apr. 8, 2020

(87) PCT Pub. No.: WO2019/081304
PCT Pub. Date: May 2, 2019

(65) Prior Publication Data
US 2020/0313551 A1    Oct. 1, 2020

(30) Foreign Application Priority Data

Oct. 25, 2017 (EP) ..................................... 17198261

(51) Int. Cl.
*H02M 3/07* (2006.01)
*H02M 1/32* (2007.01)

(52) U.S. Cl.
CPC ............. *H02M 3/073* (2013.01); *H02M 1/32* (2013.01); *H02M 3/077* (2021.05)

(58) Field of Classification Search
CPC .. G05F 3/00; G05F 3/205; G11C 5/00; G11C 5/145; H02M 1/00; H02M 1/32;
(Continued)

(56) References Cited

U.S. PATENT DOCUMENTS 5,812,017 A * 9/1998 Golla ..................... G05F 1/465
327/536
2002/0084830 A1    7/2002 Seo et al.
(Continued)

FOREIGN PATENT DOCUMENTS

| EP | 1798626 A1 | 6/2007 |
|---|---|---|
| JP | H03126112 A | 5/1991 |
| KR | 20030003551 A | 1/2003 |

OTHER PUBLICATIONS

G. H. Barbehenn, "2.7V to 38V Vin Range, Low Noise, 250mA Buck-Boost Charge Pump Converter," LT Journal of Analog Innovation; Jan. 2014, pp. 9-11.
(Continued)

*Primary Examiner* — Diana J. Cheng
*Assistant Examiner* — Dave Mattison
(74) *Attorney, Agent, or Firm* — Slater Matsil, LLP (57) ABSTRACT

A charge pump structure is disclosed. In an embodiment a regulated charge pump structure includes an output terminal configured to provide a regulated output voltage, a first charge pump configured to generate the output voltage as a function of an input supply voltage and a control circuit configured to limit a level of the output voltage and to generate a control voltage, wherein the level of the output voltage is controlled by the control voltage such that the output voltage does not exceed a threshold value.

15 Claims, 4 Drawing Sheets

(58) Field of Classification Search
CPC ....... H02M 2003/00; H02M 2003/077; H02M 3/00; H02M 3/07; H02M 3/073
USPC ........................................................ 327/536
See application file for complete search history.

(56) References Cited

U.S. PATENT DOCUMENTS

| | | | |
|---|---|---|---|
| 2007/0053234 A1* | 3/2007 | Tsukada | G11C 7/065 365/205 |
| 2007/0153589 A1* | 7/2007 | Tailliet | H02M 3/073 365/189.06 |
| 2009/0184753 A1* | 7/2009 | Kawashima | H02M 3/073 327/536 |
| 2010/0244935 A1* | 9/2010 | Kim | G11C 5/145 327/536 |
| 2011/0089916 A1 | 4/2011 | Soenen et al. | |
| 2013/0148456 A1* | 6/2013 | Cho | H02M 3/073 365/226 |
| 2014/0091840 A1* | 4/2014 | Asam | H03K 3/012 327/109 |
| 2017/0346284 A1* | 11/2017 | Lee | H02J 1/00 |

OTHER PUBLICATIONS

G. Palumbo, et al., "Charge Pump Circuits: An Overview on Design Strategies and Topologies," IEEE Circuits and Systems Magazine, First Quarter 2010, Mar. 15, 2010, pp. 31-45.

Texas Instruments, "TPS6302x High Efficiency Single Inductor Buck-Boost Converter With 4-A Switches," SLVS916D, Jul. 2010, Revised Oct. 2015, pp. 1-30.

* cited by examiner

CHARGE PUMP STRUCTURE WITH REGULATED OUTPUT VOLTAGE

This patent application is a national phase filing under section 371 of PCT/EP2018/078413, filed Oct. 17, 2018, which claims the priority of European patent application 17198261.4, filed Oct. 25, 2017, each of which is incorporated herein by reference in its entirety.

TECHNICAL FIELD

The present disclosure relates to a charge pump structure with a regulated output voltage.

BACKGROUND

Charge pumps are utilized to generate output voltage levels above an available supply voltage. They have the advantage of being inductorless and operating with comparably low interference problems. A usual charge pump generates a fixed multiple of some supply voltage.

There are various methods to generate higher voltages from a low supply voltage. All of them can be amended by a regulation structure, which makes the generated voltage potentially configurable and stabilized. This is typically done using a voltage divider to compare the output voltage to some stabilized reference. Overvoltage protection is typically not inherent, but must be basically added as a separate function just in case.

The charge pumps define their output voltage by design structure as a multiple of their supply voltage. This may be a safe procedure, regarding overvoltage, but is problematic for a configurable ASSP chip which has to be operable in a whole range of supply voltages, for example 2.5 V to 3.6 V.

With the given condition of a wide range of a supply voltage Vsup, for example 2.5 V<Vsup<3.6 V, a standard charge pump structure cannot be used. For example a desired output voltage of Vout=15 V at Vsup=2.5V could be generated by a standard charge pump having a multiplication factor k=6 so that the charge pump generates an output voltage Vout=k*Vsup=6*Vsup. However, at another input supply voltage of Vsup=3.6 V this would yield an output voltage Vout=k*Vsup=6*3.6 V=21.6 V, which in this example would be above a safety limit of the process of 18 V.

Obviously, an ASSP chip which requires both a wide input voltage range as well as a configurable output voltage, and in addition has to obey technological safety limits, needs to implement regulation, stabilisation and limitation mechanisms.

A simple solution may be to operate the charge pump with a fixed multiplication factor and to regulate the input supply voltage Vsup down to a fixed value—in the example above, this would mean to reduce Vsup=3.6 V to Vsup=2.5 V by a standard linear voltage regulator. But this would be a highly inefficient and still not very flexible solution: The power, given by the 1.1 V voltage drop multiplied by the input current, would be lost, limiting efficiency to below 70%.

Another possibility to generate a configurable high output voltage is based on using an inductance-based switched-mode converter. These power converters are known for their high interference level and their comparably bulky components. In particular in gas meter applications many users refuse inductance-based power converters to avoid possibly high induced voltage peaks or even sparks in failure case.

There is a need to provide a charge pump structure with regulated output voltage to generate a stabilized, but configurable output voltage, wherein an upper level of the output voltage is limited.

SUMMARY

Embodiments provide a charge pump structure and provide a stabilized and configurable output voltage.

The charge pump structure with regulated output voltage comprises an output terminal to provide the output voltage, a charge pump to generate the output voltage as a function of an input supply voltage and a control circuit to limit a level of the output voltage. The control circuit is configured to generate a control voltage, wherein the level of the output voltage is controlled by the control voltage such that the output voltage does not exceed a threshold value.

The charge pump structure generates a configurable output voltage by controlling a standard charge pump based on a configurable control voltage. The charge pump to generate the output voltage may be configured as a main charge pump. The control circuit may comprise another charge pump to generate the control voltage as a function of a reference voltage. The other charge pump for generating the control voltage from the reference voltage may be configured as the reference charge pump of the charge pump structure. The reference charge pump is configured as a powerless charge pump operating from a stabilized reference where the powerless charge pump is configurable through changing its structure and thus its multiplication factor.

The proposed structure solves the problem by combining two standard charge pumps, where the main charge pump pumps power to the desired output voltage level, while the other one, i.e., the reference charge pump, is essentially powerless, but acts as a reference to the main charge pump. In this proposed structure, the main charge pump never reaches its potential maximum voltage given by the multiplication factor and the input supply voltage of the main charge pump. The main charge pump rather stops pumping at the desired output voltage level. The reference voltage and the control circuit comprising the reference charge pump inherently act as an overvoltage limiter.

In particular, the output terminal of the charge pump structure is coupled to a current branch of the control circuit, the current branch having a variable resistance. The current branch is located between the output terminal and a ground potential. The control voltage controls the variable resistance of the current branch such that the variable resistance has a lower level, when the output level of the output voltage exceeds a threshold value. The charge provided at the output terminal gets unloaded via the current branch having the low resistance. On the other hand, the control voltage controls the variable resistance of the current branch such that the variable resistance has a level higher than the lower level, when the output level of the output voltage is below the threshold value.

The variable resistance may be configured as a controllable current path of a transistor. The charge pumped to the output terminal by the main charge pump is reduced by switching the transistor in the conductive state. That means that, in the regulated charge pump structure, the voltage level of the main charge pump never reaches its potential maximum voltage, and the charge pump structure stops pumping at the desired output voltage level.

The main charge pump may be configured as an activatable charge pump that may be operated in an activated operation state to generate the pumped output voltage of the regulated charge pump structure and to be operated in a deactivated operation state to interrupt the generation of the pumped output voltage. The control circuit may generate the activation signal to activate/deactivate the main charge pump. The control circuit is configured to generate the activation signal with a level to stop the generation of the output voltage, when the level of the output voltage exceeds the threshold value.

The regulated charge pump structure may comprise an inherent overvoltage protection circuit. The inherent overvoltage protection circuit is configured to reduce the pumped output voltage, when it is detected that the pumped output voltage exceeds the threshold value and the control circuit fails to generate the activation signal to stop the generation of the output voltage, or any other failure prevents to deactivate the main charge pump, even if the control circuit has generated the activation signal.

In comparison to configurable inductance-based switched-mode converters, the proposed charge pump structure does not actively use any inductances. In comparison to standard charge pump structures, it provides a configurable output voltage that is not directly referred to the input supply voltage, but to an independently stabilized reference voltage. The proposed structure thus generates a regulated output voltage level having an upper value/threshold value independent of the supply voltage. In contrast to a typical state-of-the-art implementation, it does not use lossy voltage dividers or other inherently lossy regulation structures on the high power side. This makes it particularly suitable for highly efficient low-power applications. When using the proposed charge pump structure in common chip technologies, the area consumption of the charge pump structure is reduced and the charge pump structure causes a smaller power dissipation in comparison to a standard charge pump structure. In addition, it features an integrated overvoltage protection. In particular, the powerless generation of the control voltage allows integrating a passive overvoltage protection in an electronic circuit, the overvoltage protection being permanently effective.

Additional features and advantages are set forth in the detailed description that follows, and in part will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework to understand the nature and character of the claims.

DETAILED DESCRIPTION OF ILLUSTRATIVE EMBODIMENTS

Embodiments of a charge pump structure with regulated output voltage and its components are now be described more fully hereinafter with reference to the accompanying drawings. The embodiments of the charge pump structure and its components may, however, be embodied in many different forms and should not be construed as limited to the embodiments set forth herein; rather, these embodiments are provided so that the disclosure will fully convey the scope of the embodiments of the charge pump structure and its components to those skilled in the art. The drawing is configured to clearly illustrate the different embodiments of the charge pump structure and its components.

The basic problem to be solved is to generate a regulated, fixed voltage from a wide range of (input) supply voltages Vsup, for example 2.5 V<Vsup<3.6 V. This must be achieved without using inductors, in a low power environment and at high efficiency.

Figure 1A:
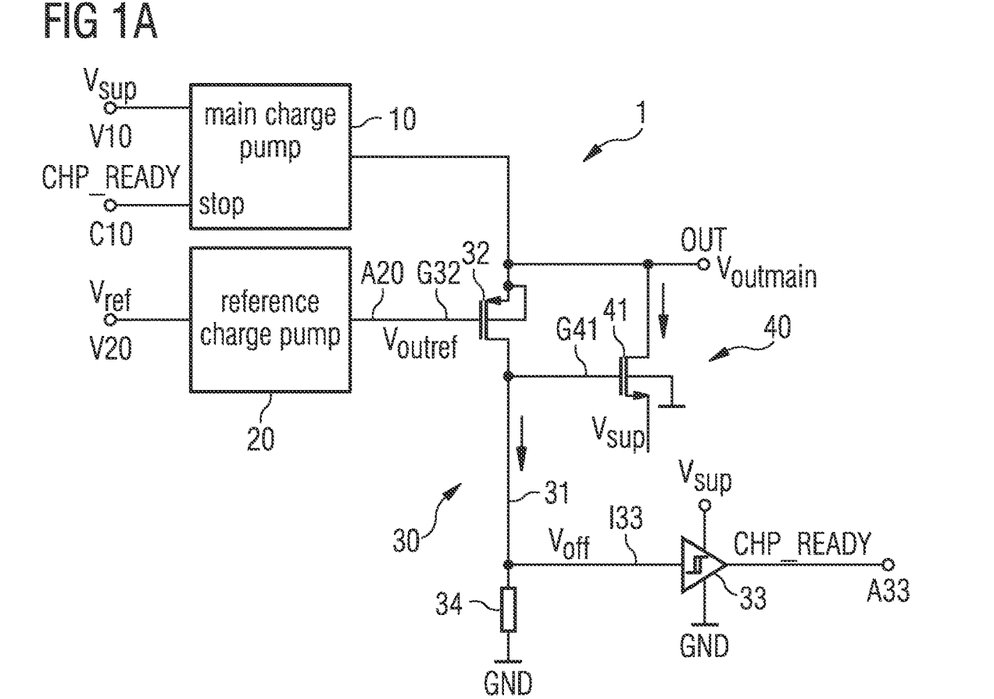
FIG. 1A shows a first embodiment of a charge pump structure with regulated output voltage.
Figure 1B:
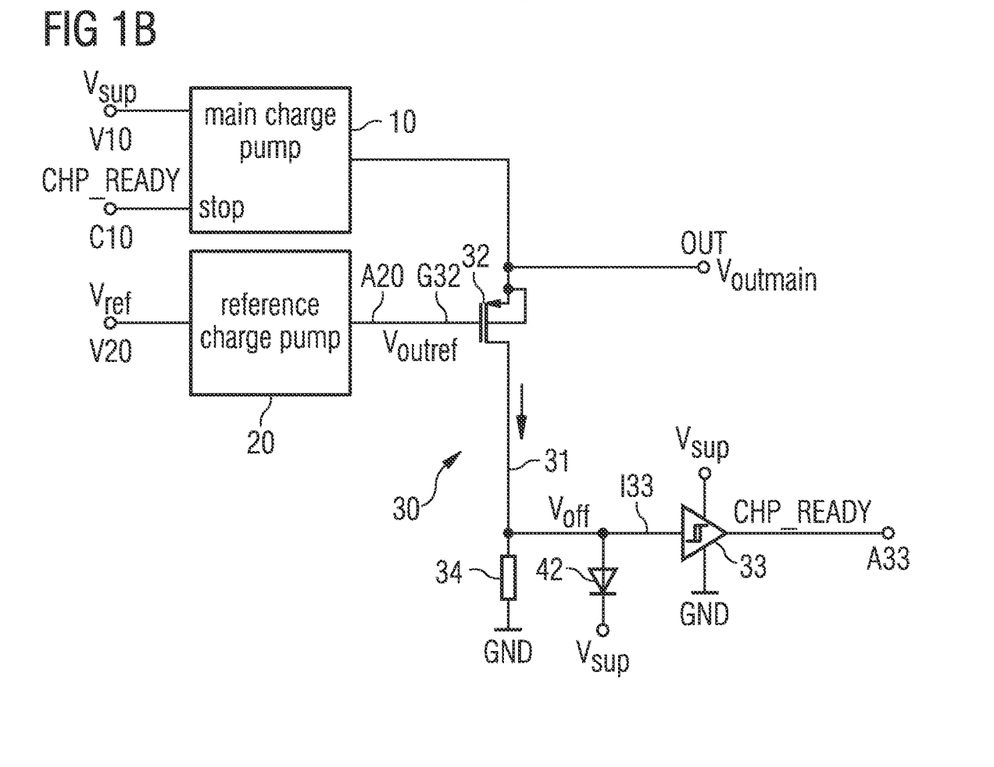
FIG. 1B shows a second embodiment of a charge pump structure with regulated output voltage.

FIG. 1 shows an embodiment of a regulated charge pump structure 1 which provides a stabilized, but configurable output voltage Voutmain having an upper limit/threshold value which is independent from the level of an input supply voltage Vsup. The regulated charge pump structure comprises an output terminal OUT to provide the output voltage Voutmain, a charge pump 10 to generate the output voltage Voutmain as a function of an input supply voltage Vsup. The input supply voltage Vsup is applied to a supply voltage input terminal V10 of the main charge pump 10. The regulated charge pump structure further comprises a control circuit 30 to limit a level of the output voltage Voutmain. The control circuit 30 is configured to generate a control voltage Voutref. The level of the output voltage Voutmain is controlled by the control voltage Voutref such that the output voltage Voutmain does not exceed a threshold value.

The control circuit 30 of the regulated charge pump structure comprises another charge pump 20 to generate the control voltage Voutref as a function of a reference voltage Vref. The charge pump 10 is configured as the main charge pump which pumps power to the desired output voltage level. The other charge pump 20 is configured as a reference charge pump. The reference charge pump 20 is configured as a powerless charge pump. The reference voltage Vref is a regulated voltage which may be available in a chip comprising the charge pump structure 1. The reference voltage Vref may be generated by a linear voltage regulator at a reference voltage input terminal V20 of the reference charge pump 20. The reference voltage Vref is multiplied in a powerless way by the reference charge pump 20 to provide the control voltage Voutref, i.e., Voutref=Vref*k. According to a possible embodiment, the multiplication factor k of the reference charge pump 20 can be variably set.

The control circuit 30 of the regulated charge pump structure comprises a current branch 31 having a variable resistance. The current branch 31 is arranged between the output terminal OUT and a ground potential GND. The variable resistance of the current branch 31 is controlled by the control voltage Voutref.

The control circuit 30 comprises a transistor 32 to provide a controllable current path having the variable resistance. The transistor 32 is arranged in the current branch 31 between the output terminal OUT and the ground potential GND. The transistor 32 comprises a control terminal G32 to apply the control voltage Voutref to control the variable resistance of the controllable current path 31.

The transistor 32 is configured to be operated such that the controllable current path 31 has a high resistance, when the level of the output voltage Voutmain of the charge pump 10 is below a threshold value. The transistor 32 is configured to be operated such that the controllable current path 31 has a low resistance, when the level of the output voltage Voutmain of the charge pump 10 is above the threshold value. In this case the high charge provided by the main charge pump 10 is unloaded via the controllable current path 31.

The transistor 32 is configured to be operated in a non-conductive state, when the level of the output voltage Voutmain of the charge pump 10 is below the threshold value. The transistor 32 is configured to be operated in a conductive-state, when the level of the output voltage Voutmain of the charge pump 10 is above the threshold value.

According to an embodiment of the regulated charge pump structure, the threshold value is the sum of a threshold voltage of the transistor 32 and a level of the control voltage Voutref generated by the reference charge pump 20.

According to an embodiment of the regulated charge pump structure 1, the charge pump 10 is configured as an activatable charge pump. The control circuit 30 is configured to operate the charge pump 10 in the activated and deactivated state. The activatable charge pump to is configured to generate the output voltage Voutmain, when the charge pump 10 is operated in the activated operation state. The activatable charge pump 10 is configured to stop the generation of the output voltage Voutmain, when the charge pump 10 is operated in the deactivated operation state.

According to an embodiment of the regulated charge pump structure 1, the control circuit 33 is configured to generate an activation signal CHP_READY with a first level such that the charge pump 10 is operated in the activated state, when the level of the output voltage Voutmain of the charge pump 10 is below a threshold voltage, for example the supply voltage Vsup. The control circuit 30 is configured to generate the activation signal CHP_READY with a second level such that the charge pump 10 is operated in the deactivated state, when the level of the output voltage Voutmain of the charge pump 10 is above the threshold voltage, for example the supply voltage Vsup.

According to an embodiment of the regulated charge pump structure, the charge pump structure may comprise a comparator circuit 33. The comparator circuit 33 has an input side I33 being coupled to the current branch 31 and an output side O33 to generate the activation signal CHP_READY to activate the main charge pump 10 to generate the output voltage Voutmain. The current branch 31 comprises at least one resistor 34 being located between the transistor 32 and the ground potential.

According to an embodiment of the regulated charge pump structure, the regulated charge pump structure 1 comprises an overvoltage protection circuit 40 to reduce the output voltage Voutmain provided at the output terminal OUT. The overvoltage protection circuit 40 comprises a controllable resistor 41 being arranged between the output terminal OUT and the ground potential GND. The overvoltage protection circuit 40 is configured such that the controllable resistor 41 is controlled to have a high resistance, when the level of an input voltage Voff of the comparator circuit 33 is below a threshold voltage, for example the supply voltage Vsup. The overvoltage protection circuit 40 is configured such that the controllable resistor 41 is controlled to have a low resistance, when the level of the input voltage Voff of the comparator circuit 33 is above a threshold voltage, for example the supply voltage Vsup.

According to an embodiment of the regulated charge pump structure 1, the controllable resistor 41 of the overvoltage protection circuit 40 is configured as another transistor having a controllable current path with a variable resistance. The other transistor 41 has a control terminal G41 to control the variable resistance of the controllable current path of the other transistor 41. The control terminal G41 of the transistor 41 is connected to the current branch 31 between the transistor 32 and the ground potential GND. Each of the transistors 32 and 41 can be a FET or a bipolar transistor.

The functioning of the regulated charge pump structure 1 is described in the following.

The main charge pump 10 is fed by the variable input supply voltage Vsup, while the powerless reference charge pump 20 operates from a stabilized input reference voltage Vref, for example 1.8 V. Through its configurable number of stages, the reference charge pump 20 permanently provides its configured and stabilized output/control voltage Voutref, for example, 6*Vref=14.4 V.

The control circuit 30 for the main charge pump 10 is built from the transistor 32, the resistor 34, for example a resistor having a high resistance or a current source at nA level, and a comparator 33. The transistor 32 features some threshold voltage Vth, for example 0.6 V. As long as the output voltage Voutmain of the main charge pump 10 does not exceed the threshold value of Voutref+Vth (=15 V in the example), no current flows through the transistor 32. Through its cyclic operation, the main charge pump 10 keeps increasing the level of the output voltage Voutmain, since the output voltage has also not reached its maximum achievable voltage level.

Around a level Voutmain=Voutref+Vth, the transistor 32 starts conducting (current indicated by the arrow at the current branch 31). Then the voltage Voff at the comparator input I33 increases rapidly, such that soon the comparator 33 toggles its output signal CHP_READY. This in turn switches off the main charge pump 32. This way the output voltage gets stabilized to Voutmain=Voutref+Vth. The charge pump structure 1 operates in a cyclic way, so this simple regulation does not constitute an uncontrolled oscillating system. The main charge pump 10 starts again when the level of the output voltage Voutmain has dropped sufficiently due to some load current, and the activation signal CHP_READY was reset to start the main charge pump 10.

According to the embodiment of the charge pump structure 1 illustrated in FIG. 1A, the inherent overvoltage protection circuit 40 simply comprises the transistor 41. It is important to keep the overvoltage protection circuit 40 simple to make it fail safe. If for any reason an essentially higher level of the output voltage (Voutmain>Voutref+Vth) appears at the output terminal OUT, the voltage potential Voff at the input side I33 of the comparator circuit 33 increases further quickly and turns on the transistor 41, i.e., switches the transistor 41 in a conductive state, after exceeding the input supply voltage Vsup. The overvoltage gets unloaded into the lower voltage Vsup, as current indicated by the arrow in the current path between the output terminal OUT and the transistor 41.

This structure gains its inherent safety from the fact that any voltage above Voutref+Vth gets shorted towards Vsup. Since the reference charge pump 20 is constructed to generate only a limited maximum of the control voltage Voutref, no overvoltage can appear, even though the main charge pump 10 may be capable of much higher output voltages (depending on the possibly high supply voltage Vsup).

FIG. 1B shows another embodiment of the regulated charge pump structure 1, wherein the same components as illustrated in FIG. 1A are denoted with the same reference numbers. The main charge to, the reference charge pump 20 and the control circuit 3o are the same and have the same functionality as shown in FIG. 1A. The regulated charge pump structure 1 of FIG. 1B comprises an overvoltage protection circuit 40 to reduce the output voltage Voutmain provided at the output terminal OUT, wherein the overvoltage protection circuit is different from the overvoltage protection circuit 40 of FIG. 1A. The overvoltage protection circuit 40 of FIG. 1B comprises a diode 42 being arranged between the input side 133 of the comparator circuit 33 and the input supply voltage Vsup.

As shown according to the embodiment of the charge pump structure of FIG. 1B, the functionality of the transistor 41 may be implemented even simpler by adding the diode 42 between the input side 133 of the comparator circuit 33 (anode of diode 42) and the input supply voltage Vsup (cathode of diode 42) instead. Then the unloading current would flow through the current branch 31 and the transistor 32. However, in a real implementation it is advantageous to choose transistor 32 as a comparably small FET, while transistor 41 can be selected independently to be capable of high currents.

For comparison, the common alternative of using a resistive voltage divider to measure and compare the output voltage Voutmain to some stabilized reference should be discussed. This is surely possible und would replace the reference charge pump 20. However, in a low power design the current drawn even by a high resistance voltage divider easily exceeds the current consumption of the reference charge pump 20. Since the current drawn from the output voltage Voutmain appears at the input terminal V10 multiplied by the multiplication factor of the main charge pump 10, a resistor network of even 15 MΩ would cause 6 µA additional current consumption while the reference charge pump 20 consumes only 0.5 µA at the chosen example values of Voutmain=15V.

The proposed structure described above can be built with a wide variety of individual charge pump structures illustrated in FIGS. 2A, 2B, 2C and 3. The charge pumps typically multiply the input supply voltage Vsup by some fixed factor, using so called "flying capacitors" which are charged to the supply voltage and then switched to be in series with the supply voltage or other multiples of it. The output voltage is generally stored and smoothed by a large capacitor at the final output (not shown).

Figure 2A:
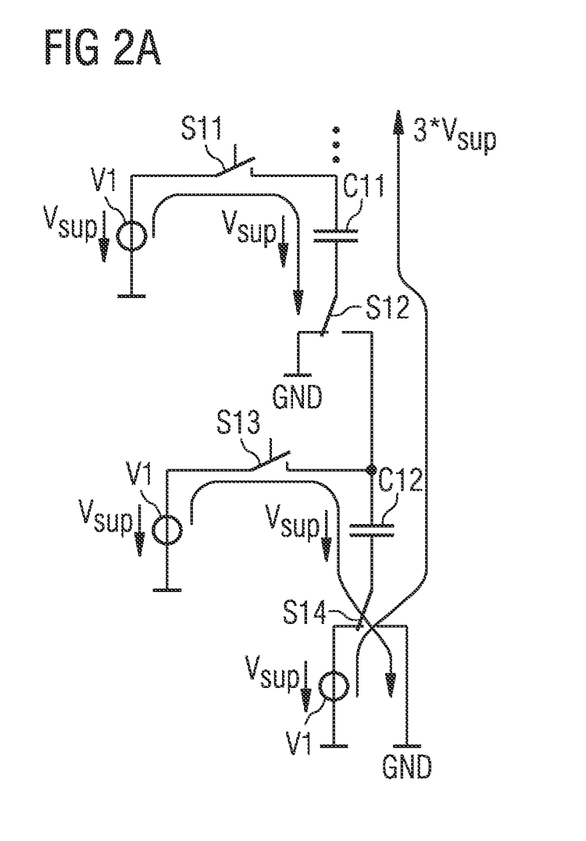
FIG. 2A shows an embodiment of a main charge pump of the charge pump structure with regulated output voltage.

FIG. 2A shows an embodiment of a charge pump comprising the supply voltage sources V1 to provide the supply voltage Vsup. One of the supply voltage sources V1 is coupled to a capacitor C11 via a controllable switch S11. The capacitor C11 is coupled to a ground potential by a controllable switch S12. The charge pump further comprises another supply voltage source V1 to provide the supply voltage Vsup which is coupled by a controllable switch S13 to a capacitor C12. The capacitor C12 is coupled to the ground potential GND by the controllable switch S14. The charge pump generates a level of 3*Vsup of the output voltage using two flying capacitors loaded to the supply voltage Vsup in series, as illustrated by the arrows.

Figure 2B:
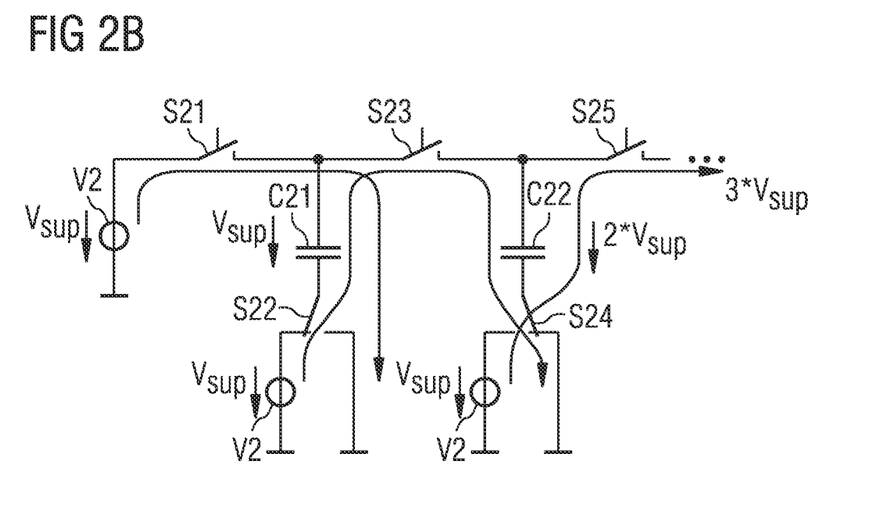
FIG. 2B shows another embodiment of a main charge pump of the charge pump structure with regulated output voltage.

FIG. 2B shows another embodiment of a charge pump comprising supply voltage sources V2 to provide a supply voltage Vsup. The charge pump further comprises controllable switches S21, S22, S23, S24 and S25 and capacitors C21 and C22. The charge pump generates a level of 3*Vsup of the output voltage using two flying capacitors, where the first capacitor C21 is loaded to Vsup and the second capacitor C22 is loaded to 2*Vsup. The current paths of the various operational cycles are illustrated in FIG. 2B by the arrows. During a first operational cycle the capacitor C21 is loaded to the level of the supply voltage Vsup. The capacitor C22 is loaded during a second operational cycle to 2*Vsup. The level of 3*Vsup is generated at the output of the charge pump during a third operational cycle.

Figure 2C:
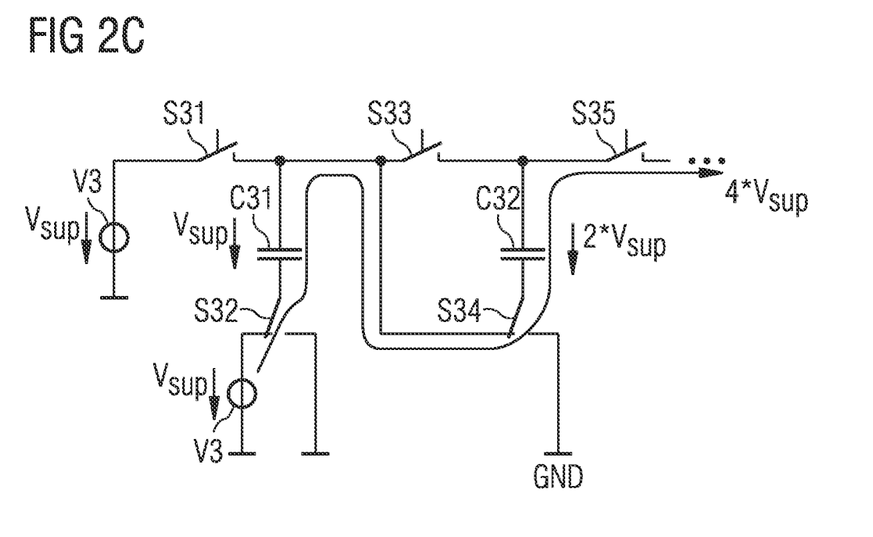
FIG. 2C shows another embodiment of a main charge pump of the charge pump structure with regulated output voltage.

FIG. 2C shows another embodiment of a charge pump comprising the supply voltage sources V3, the controllable switches S31, S32, S33, S34 and S35. The charge pump further comprises the capacitors C31 and C32. The charge pump generates a level of 4*Vsup using two flying capacitors C31 and C32, where the second stage uses the first as Vsup, thus doubling its output voltage to 2*Vsup. During a last operational cycle an output voltage of 4*Vsup is generated, as shown by the arrow in FIG. 2C.

Figure 3:
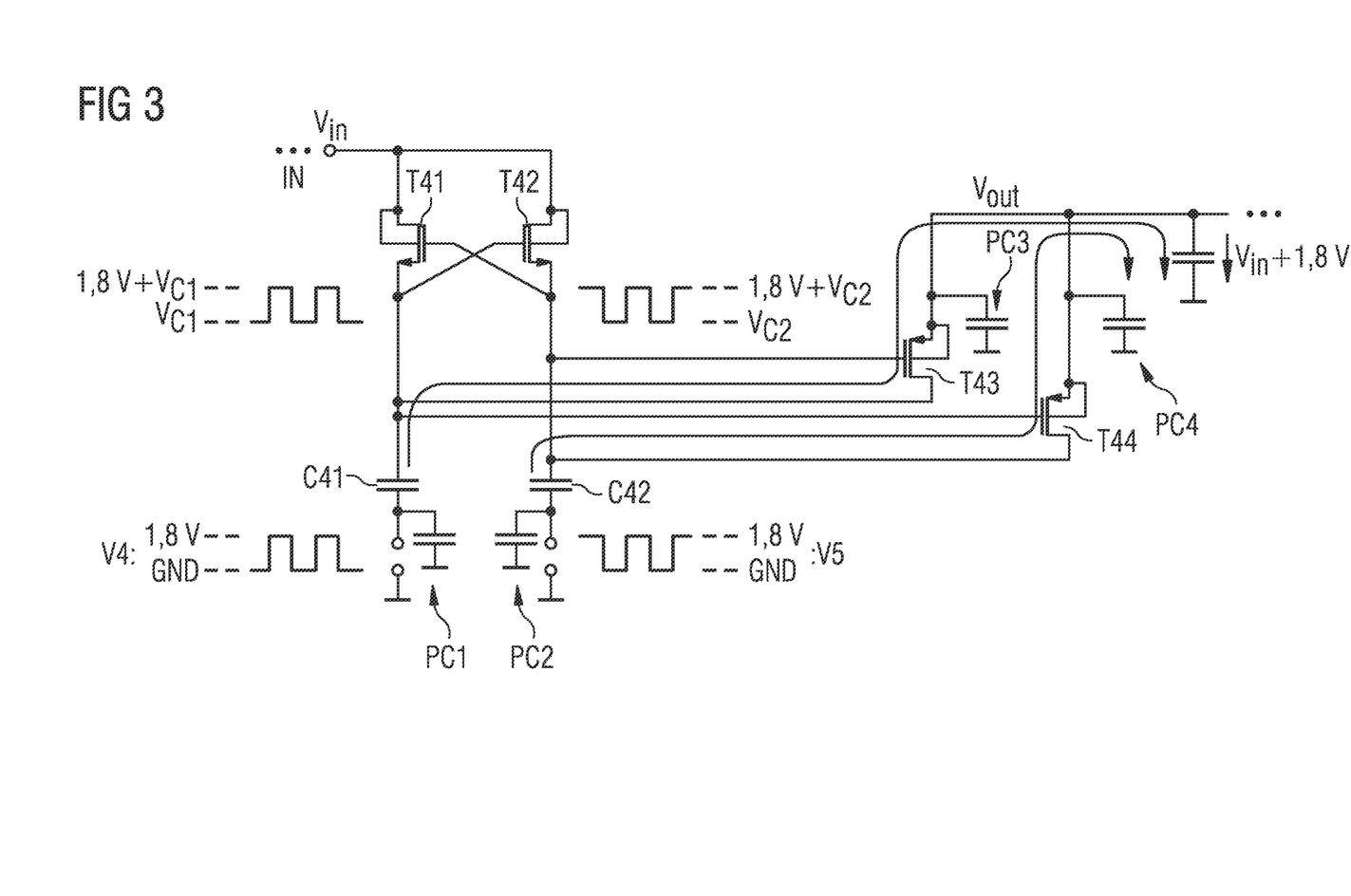
FIG. 3 shows an embodiment of a reference charge pump of the charge pump structure with regulated output voltage.

FIG. 3 sketches one stage of a charge pump that can be employed in integrated circuits at low power levels. The charge pump is configured as a symmetric charge pump stage with, for example, Vsup=1.8 V. This structure is well suitable for chip integration through its insensitivity to parasitic capacitances PC1, PC2, PC3 and PC4 which contribute in this structure to the desired function. The charge pump further comprises cross-coupled transistors T41 and T42 and other transistors T43 and T44. The charge pump further comprises capacitors C41, C42 and Cout. A first and a second supply voltage source V4 and V5 generate square-wave voltages, as illustrated in FIG. 3. Such stages can be stacked, and each stage basically increases its input voltage by Vsup.

According to a possible embodiment, the reference charge pump 20 shown in FIGS. 1A and 1B can be employed as a configurable 1-to-8-stage symmetric charge pump as shown in FIGS. 2A, 2B and 2C, operating from a stabilized reference voltage Vref=1.8 V. Using a design similar to FIGS. 2A, 2B and 2C, its output/control voltage Voutref is further increased by one more reference voltage Vref and, configurable as LSB, by another stabilized voltage around 0.9 V. Taking the threshold voltage Vth=0.6 V into consideration, this yields a 4-bit configurable range of output voltages of Voutmain=4.2 V . . . 17.7 V, in steps of 0.9 V. In reality these values are slightly different, considering other parasitic effects. This powerless reference charge pump needs only very small capacitances and is fully integrated.

According to a possible embodiment, the main charge pump 10 may be built from three doubling stages as sketched in FIG. 2B. It is thus capable to generate an output voltage of Voutmain=2*2*2*Vsup=20 V . . . 28.8 V. These values may be somewhat reduced in a real implementation. Using the doubling stages concept, the number of large external capacitors for power pumping is reduced to 3 plus the obligatory final storage capacitor at the output.

The main charge pump 10 also features a configurable multiplication factor, for fast start-up times and optimized overall efficiency. However, the output voltage is fully controlled by the reference charge pump 20, as long as the main charge pump 10 is configured for a higher maximum output voltage.

In summary, the implemented structure aims at high efficiency in a low-power system and at a high level of circuit protection. It provides a regulated and stabilized output voltage and avoids the additional current typically caused by a regulation using voltage dividers.

The invention claimed is:

1. A regulated charge pump structure comprising:
   an output terminal configured to provide a regulated output voltage;
   a charge pump configured to generate the output voltage as a function of an input supply voltage;
   a control circuit configured to:
      limit a level of the output voltage; and
      generate a control voltage; and
   an overvoltage protection circuit,
   wherein the level of the output voltage is controlled by the control voltage such that the output voltage does not exceed a threshold value,
   wherein the control circuit comprises:
      another charge pump configured to generate the control voltage as a function of a reference voltage, and
      a current branch arranged between the output terminal and a ground potential, the current branch comprising a transistor and a resistor,
      wherein the transistor comprises a control terminal configured to receive the control voltage,
   wherein the overvoltage protection circuit comprises another transistor,
   wherein the other transistor has a control terminal connected to a node of the current branch between the transistor and the resistor,
   wherein the charge pump comprises:
      a first cross-coupled transistor and a second cross-coupled transistor cross-coupled to each other,
      a first capacitor and a second capacitor, and
      a first and a second supply voltage source configured to generate square-wave voltages,
      wherein the first cross-coupled transistor is coupled to the first supply voltage source via the first capacitor,
      wherein the second cross-coupled transistor is coupled to the second supply voltage source via the second capacitor, and
      wherein the output terminal is coupled to a node between the first cross-coupled transistor and the first capacitor and to a node between the second cross-coupled transistor and the second capacitor.

2. The regulated charge pump structure of claim 1, wherein the other charge pump is a powerless charge pump.

3. The regulated charge pump structure of claim 1, wherein the reference voltage is configured as a stabilized voltage.

4. The regulated charge pump structure of claim 1,
   wherein the current branch has a variable resistance, and
   wherein the variable resistance of the current branch is controlled by the control voltage.

5. The regulated charge pump structure of claim 4,
   wherein the transistor is configured to provide a controllable current path having the variable resistance, and
   wherein the control terminal of the transistor is configured to receive the control voltage to control the variable resistance of the controllable current path.

6. The regulated charge pump structure of claim 5, wherein the transistor is configured to be operated such that the controllable current path has a high resistance, when the level of the output voltage of the charge pump is below the threshold value, and the controllable current path has a low resistance, when the level of the output voltage of the charge pump is above the threshold value.

7. The regulated charge pump structure of claim 5,
   wherein the transistor is configured to be operated in a non-conductive state, when the level of the output voltage of the charge pump is below the threshold value, and
   wherein the transistor is configured to be operated in a conductive-state, when the level of the output voltage of the charge pump is above the threshold value.

8. The regulated charge pump structure of claim 6, wherein the threshold value is a sum of a threshold voltage of the transistor and a level of the control voltage generated by the other charge pump.

9. The regulated charge pump structure of claim 4,
   wherein the overvoltage protection circuit is configured to reduce the output voltage provided at the output terminal,
   wherein the overvoltage protection circuit comprises a controllable resistor being arranged between the output terminal and the ground potential,
   wherein the overvoltage protection circuit is configured such that the controllable resistor is controlled to have a high resistance, when the level of an input voltage of a comparator circuit is below a threshold voltage of the output voltage, and
   wherein the overvoltage protection circuit is configured such that the controllable resistor is controlled to have a low resistance, when the level of the input voltage of the comparator circuit is above the threshold voltage of the output voltage.

10. The regulated charge pump structure of claim 9,
    wherein the controllable resistor of the overvoltage protection circuit is configured as the other transistor having a controllable current path with a variable resistance,
    wherein the control terminal of the other transistor is configured to control the variable resistance of the controllable current path of the other transistor, and
    wherein the control terminal of the other transistor is connected to the current branch between the transistor and the ground potential.

11. The regulated charge pump structure of claim 1,
    wherein the charge pump is an activatable charge pump,
    wherein the control circuit is configured to operate the charge pump in an activated state and a deactivated state,
    wherein the charge pump is configured to generate the output voltage, when the charge pump is operated in the activated state, and
    wherein the charge pump is configured to stop generation of the output voltage, when the charge pump is operated in the deactivated state.

12. The regulated charge pump structure of claim 11,
    wherein the control circuit is configured to generate an activation signal with a first level such that the charge pump is operated in the activated state, when the level of the output voltage of the charge pump is below a threshold voltage, and
    wherein the control circuit is configured to generate the activation signal with a second level such that the charge pump is operated in the deactivated state, when the level of the output voltage of the charge pump is above the threshold voltage.

13. The regulated charge pump structure of claim 11, further comprising:
    a comparator circuit having an input side being coupled to the current branch and an output side configured to generate an activation signal to activate the charge pump to generate the output voltage.

14. The regulated charge pump structure of claim 13, wherein the overvoltage protection circuit is configured to reduce the output voltage provided at the output terminal, and wherein the overvoltage protection circuit comprises a diode being arranged between the input side of the comparator circuit and the input supply voltage.

15. A regulated charge pump structure comprising:

an output terminal configured to provide a regulated output voltage;

a charge pump configured to generate the output voltage as a function of an input supply voltage; and a control circuit configured to:
  limit a level of the output voltage; and
  generate a control voltage, wherein the level of the output voltage is controlled by the control voltage such that the output voltage does not exceed a threshold value, wherein the control circuit comprises another charge pump configured to generate the control voltage as a function of a reference voltage, wherein the control circuit comprises a current branch that is arranged between the output terminal and a ground potential, the current branch comprising a transistor and a resistor, wherein the transistor comprises a control terminal configured to receive the control voltage, wherein the charge pump structure comprises an overvoltage protection circuit which comprises another transistor, and wherein the other transistor has a control terminal that is connected to a node of the current branch between the transistor and the resistor.

* * * * *